(12) United States Patent
Watson et al.

(10) Patent No.: US 9,800,588 B1
(45) Date of Patent: Oct. 24, 2017

(54) AUTOMATED ANALYSIS PIPELINE DETERMINATION IN A MALWARE ANALYSIS ENVIRONMENT

(71) Applicant: Symantec Corporation, Mountain View, CA (US)

(72) Inventors: Andrew Collingwood Watson, Cheltenham (GB); Abubakar A Wawda, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 135 days.

(21) Appl. No.: 14/972,001

(22) Filed: Dec. 16, 2015

(51) Int. Cl.
   *H04L 29/06* (2006.01)
(52) U.S. Cl.
   CPC ............ *H04L 63/14* (2013.01); *H04L 63/145* (2013.01); *H04L 63/1466* (2013.01)
(58) Field of Classification Search
   CPC ...... H04L 63/14; H04L 63/145; H04L 63/148
   See application file for complete search history.

(56) References Cited

U.S. PATENT DOCUMENTS

| | | | | |
|---|---|---|---|---|
| 6,968,461 B1* | 11/2005 | Lucas | ................... | G06F 21/564 713/187 |
| 9,009,459 B1* | 4/2015 | Nachenberg | ............ | G06F 21/56 713/153 |
| 9,064,120 B2* | 6/2015 | Satish | ....................... | G06F 8/60 |
| 9,479,531 B1* | 10/2016 | Watson | ............... | H04L 63/1425 |
| 2005/0039029 A1* | 2/2005 | Shipp | .................... | G06F 21/563 713/188 |
| 2012/0017275 A1* | 1/2012 | Harmonen | .......... | H04L 63/1425 726/24 |
| 2012/0084865 A1* | 4/2012 | Niemela | ............... | G06F 21/563 726/24 |
| 2012/0174227 A1* | 7/2012 | Mashevsky | ........... | G06F 21/562 726/24 |
| 2012/0311708 A1* | 12/2012 | Agarwal | ................. | G06F 21/55 726/24 |
| 2013/0139260 A1* | 5/2013 | McDougal | .......... | H04L 63/1433 726/23 |
| 2013/0145471 A1* | 6/2013 | Richard | ................ | G06F 21/564 726/24 |
| 2013/0312099 A1* | 11/2013 | Edwards | ............... | G06F 21/554 726/24 |
| 2015/0089647 A1* | 3/2015 | Palumbo | ............... | H04L 63/145 726/23 |

\* cited by examiner

*Primary Examiner* — Ali Shayanfar
(74) *Attorney, Agent, or Firm* — Patent Law Works LLP

(57) ABSTRACT

A current selection of previously identified malicious files is identified. The selection includes identified malicious files in multiple formats that are tested by a malware analysis environment. Each specific malicious file is opened multiple times, using multiple versions of one or more corresponding program(s). The behavior of each malicious file is analyzed as it is opened with each version of the corresponding program(s). Based on observed behavior of malicious files as they are opened, the exploitability of each version of each program is determined and ranked. The malware analysis environment uses a specific number of versions of each program to test submitted files for maliciousness, in order from more exploitable to less so, based on the ranking. The specific number of versions of a given program to use is generally less than the total available number of versions, thereby reducing the time and computing resources spent per file.

20 Claims, 3 Drawing Sheets

AUTOMATED ANALYSIS PIPELINE DETERMINATION IN A MALWARE ANALYSIS ENVIRONMENT

TECHNICAL FIELD

This disclosure pertains generally to computer security, and more specifically to an automated self-optimizing malware analysis environment.

BACKGROUND

With the large volume of malware in daily circulation, automated malware analysis environments are important tools in the detection of malicious files. An automated analysis environment enables automatic testing of submitted files without risk to production computers, e.g., by opening/running/analyzing files in a virtualized or sandboxed environment. A key concern with automated malware analysis environments is the time required to generate an accurate disposition of a file submitted for analysis. With so many files being analyzed, the time and resources utilized to make each determination adds up significantly. Furthermore, some versions of file readers, viewers and players used to open files in different formats being analyzed present a greater attack surface or contain a greater number of exploitable vulnerabilities than others (e.g., Adobe Reader versions 9.1 vs 10.3). If all or many versions of a program are used in automatic malware analysis, the time and resources per disposition increases. On the other hand, if only a small sample of available versions are used, automated malware analysis could fail to detect malicious files where the more vulnerable version(s) are omitted.

It would be desirable to address these issues.

SUMMARY

An optimal pipeline for files submitted to a malware analysis environment is automatically determined. The most reliably exploitable versions of software programs used by the automated malware analysis environment to test submitted files are identified, so that the submitted files can be processed using only a subset of the available versions of software programs, in an optimal order. This optimization results in an accurate disposition of submitted files in a shorter period of time, by using more reliably exploitable versions of software programs to test the files.

A current selection of previously identified malicious files is identified. The selection includes identified malicious files in multiple file formats that are tested by the malware analysis environment. For example, a selection of previously identified malicious media files in multiple Multipurpose Internet Mail Extension ("MIME) formats can be collected (e.g., images, documents, audio, video, etc.). In one embodiment, the current selection of previously identified malicious files can be received from an anti-malware software platform which identifies malicious files during its ordinary course of operation. Each specific malicious file of the current selection is opened multiple times, using multiple versions of one or more program(s) that correspond to the given file format. A number of different programs are used to open malicious files in different ones of the multiple file formats. For example, video files can be played by multiple versions of one or more video players, image files viewed by multiple versions of one or more image readers, etc. Other examples include document readers, audio players, run time environments and so on. Specific ones of the malicious files can be opened multiple times using each specific one of the multiple versions of the program(s) that correspond(s) to the file format, or one time each using each version, depending upon the embodiment.

The behavior of each malicious file is analyzed as it is opened with each version of the corresponding program(s). This analysis can take the form of collecting observations concerning malicious behaviors performed by each malicious file when it is opened. Thus, it can be determined whether known attacks are reliably repeatable when a given malicious file is opened with each given version of the corresponding program(s). Based on observed behavior of malicious files as they are opened with different versions of corresponding program(s), the exploitability of each version of each specific program is determined and ranked. This can take the form of ranking the exploitability of each specific version of each specific program based on the number and/or frequency of attacks observed when one or more malicious file(s) are opened therewith. In some embodiments, different types of attacks are weighted as being more or less severe than others, based on their nature, target(s), etc.

The malware analysis environment uses a specific number of versions of each program to test submitted files in corresponding formats for maliciousness, in order from more exploitable to less so based on the ranking. The specific number of versions of a given program to use to test submitted files varies between embodiments, but is generally less than the total available number of versions of the specific program, thereby reducing the time and computing resources spent per file. Because the most exploitable versions of each software program are used, submitted malicious files are still likely to be identified. Furthermore, because files are opened by versions of a program starting with the most exploitable, malicious files are often identified without even having to test with each of the specific number of versions.

Periodically, the current selection of previously identified malicious files can be updated, so that a current selection is maintained. The analysis process can periodically be re-run on the updated selections, so that the behavior of each malicious file in the updated selection is analyzed. Thus, the current exploitability rankings of versions of software programs can be periodically re-determined using updated malicious files. In addition, when a new version of a specific program is released, the exploitability of each version of the specific program including the new one can be determined and ranked.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
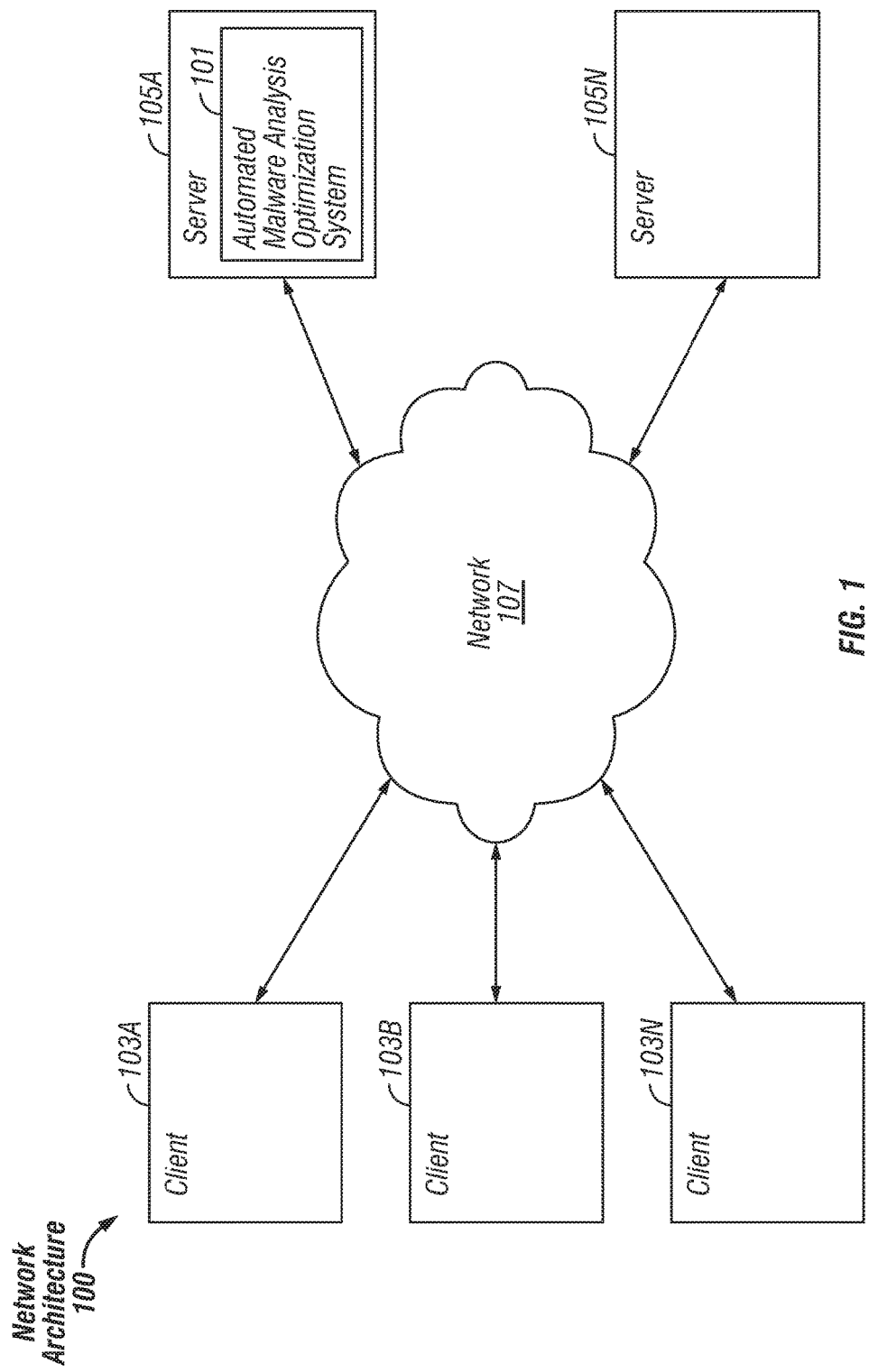
FIG. 1 is a block diagram of an exemplary network architecture in which an automated malware analysis optimization system can be implemented, according to some embodiments.

FIG. 1 is a block diagram illustrating an exemplary network architecture 100 in which an automated malware analysis optimization system 101 can be implemented. The illustrated network architecture 100 comprises multiple clients 103A, 103B and 103N, as well as multiple servers 105A and 105N. In FIG. 1, the automated malware analysis optimization system 101 is illustrated as residing on server 105A. It is to be understood that this is an example only, and in various embodiments various functionalities of this system 101 can be distributed between multiple computing devices 210 as desired.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can but need not be in the form of mobile computing devices, comprising portable computer systems 210 capable of connecting to a network 107 and running applications. Examples of mobile computing devices are smartphones, tablets, wearable devices such as smart watches, laptop computers, etc.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
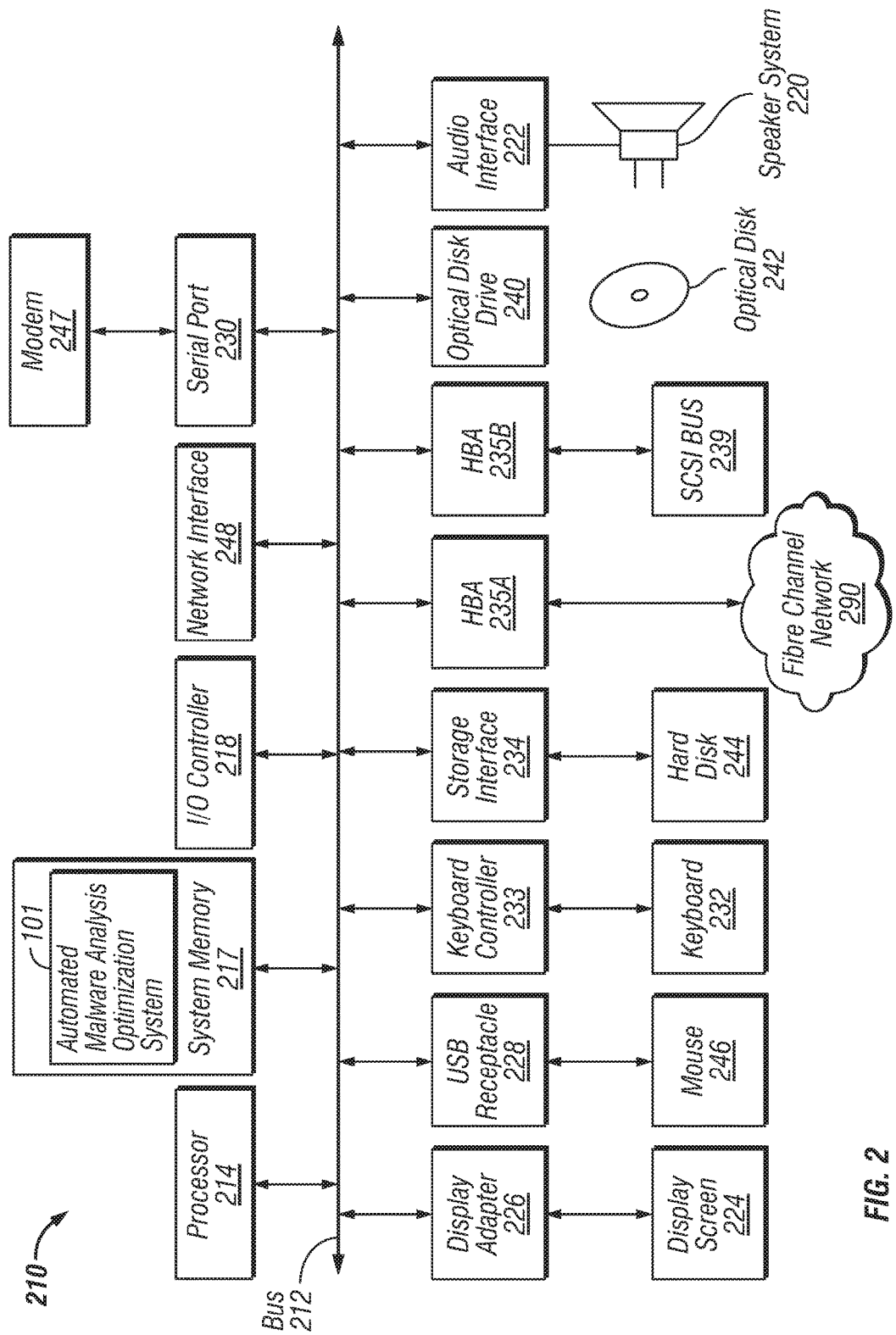
FIG. 2 is a block diagram of a computer system suitable for implementing an automated malware analysis optimization system, according to some embodiments.

FIG. 2 is a block diagram of a computer system 210 suitable for implementing an automated malware analysis optimization system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory, an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) ports 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB port 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices via, e.g., USB ports 228). In different embodiments the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 241, flash memory) and loaded into system memory 217 and executed by the processor 214. Application programs can also be loaded into system memory 217 from a remote location (i.e., a remotely located computer system 210), for example via the network interface 248. In FIG. 2, the automated malware analysis optimization system 101 is illustrated as residing in system memory 217. The workings of the automated malware analysis optimization system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and/or modem 247 can be directly or indirectly communicatively coupled to a network 107 such as the internet. Such coupling can be wired or wireless.

Figure 3:
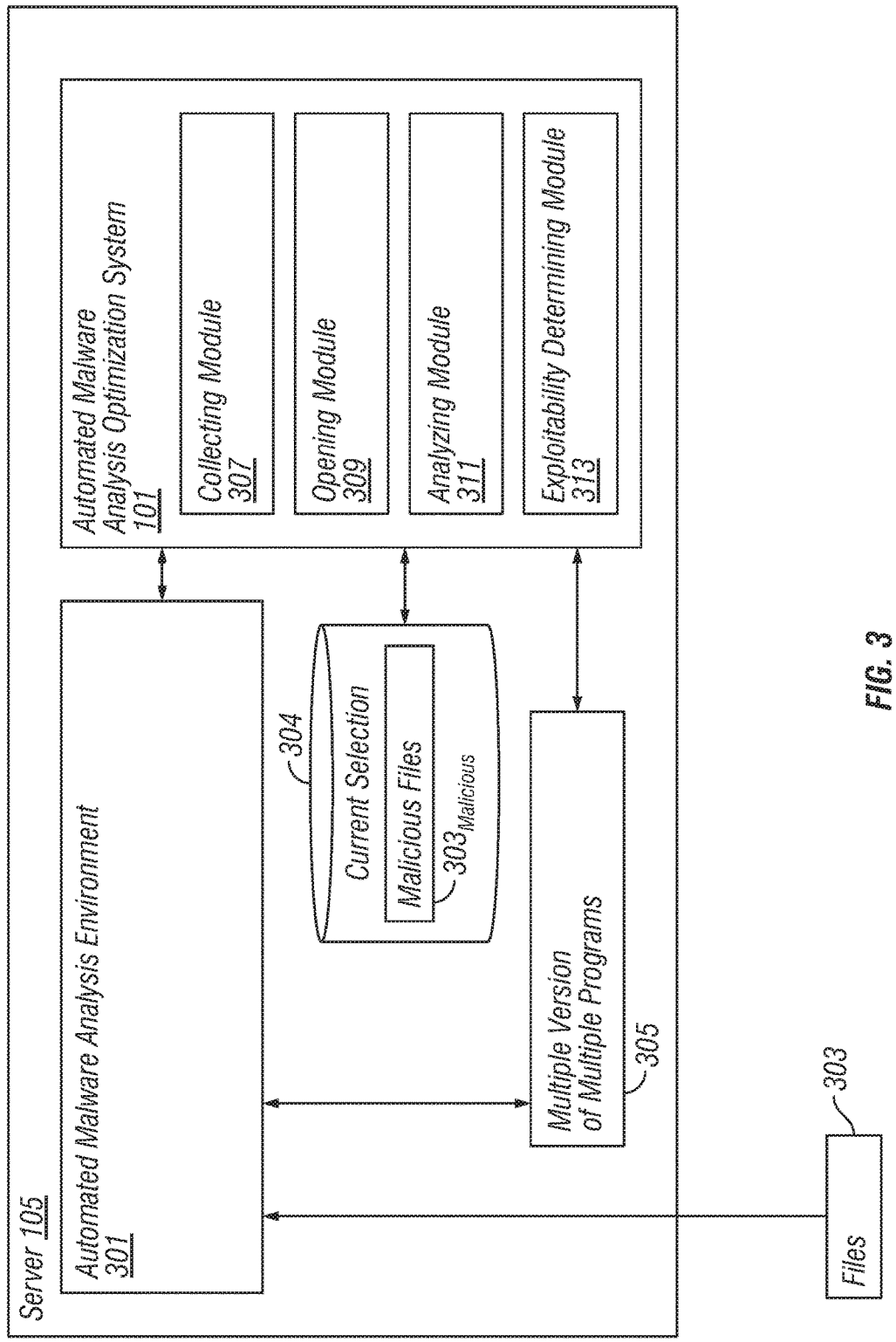
FIG. 3 is a high level block diagram of the operation of an automated malware analysis optimization system, according to some embodiments.

FIG. 3 illustrates the operation of an automated malware analysis optimization system 101 running on a server 105. As described above, the functionalities of the automated malware analysis optimization system 101 can reside on specific computers 210 or be otherwise distributed between multiple computer systems 210, including within a fabric/cloud-based computing environment in which the functionality of the automated malware analysis optimization system 101 is provided as a service over a network 107. It is to be understood that although the automated malware analysis optimization system 101 is illustrated in FIG. 3 as a single entity, the illustrated automated malware analysis optimization system 101 represents a collection of functionalities, which can be instantiated as a single or multiple modules as desired (instantiation of a specific, multiple module automated malware analysis optimization system 101 is illustrated in FIG. 3). It is to be understood that the modules of the automated malware analysis optimization system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client computer," "server computer" and "computing device" mean one or more computers configured and/or programmed to execute the described functionality. Additionally, program code to implement the functionalities of the automated malware analysis optimization system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

As illustrated in FIG. 3, the automated malware analysis optimization system 101 runs on a server 105 in conjunction with an automated malware analysis environment 301. Although the automated malware analysis optimization system 101 and the automated malware analysis environment 301 are both illustrated as residing on a single server 105, in practice these components represent collections of functionalities which can be distributed across multiple servers 105 and/or other computing devices 210 and provided as cloud based services. It is also to be understood that the automated malware analysis environment 301 and the automated malware analysis optimization system 101 can, but need not, operate in conjunction with a more comprehensive anti-malware software platform (not specifically illustrated), in which a variety of tools are used to detect, block and otherwise manage malware, for example at enterprise and end point levels.

As described in detail below, the automated malware analysis optimization system 101 automatically determines an optimal pipeline for files 303 submitted to the malware analysis environment 301 for disposition as malicious or benign. More specifically, the automated malware analysis optimization system 101 identifies the most reliably exploitable versions of software programs 305 (e.g., players and readers and the like) used by the automated malware analysis environment 301 to test submitted files 303. This enables the automated malware analysis environment 301 to process submitted files 303 using a subset of the available versions of software programs 305, while still maintaining accuracy and breadth of behavioral analysis observations. This optimization results in an accurate disposition of submitted files 303 in a shorter period of time, by using more reliably exploitable versions of software programs 305 to test the files 303. This in turn allows for files 303 to be processed more quickly, decreasing the time to disposition from the perspective of the submitting parties, while at the same time requiring less resources on the backend.

The optimization process is now described in greater detail. A malicious file collecting module 307 of the automated malware analysis optimization system 101 collects a current selection of identified malicious files $303_{MALICIOUS}$ in a plurality of file formats that are tested by the automated malware analysis environment 301. The specific file formats that are tested by the automated malware analysis environment 301 varies between embodiments, but the automated malware analysis environment 301 can test, for example, media files 303 (e.g., documents, audio, video, graphics) in specific formats (e.g., .pdf, .docx, .mp3, .alac, .flac, .mpeg, .jpg, etc.) by opening/playing/executing them using various versions of corresponding software programs 305 (e.g., Adobe Reader, Adobe Acrobat, Microsoft Word, Windows Media Player, Quicktime, etc.).

In different embodiments, the malicious file collecting module 307 collects files $303_{MALICIOUS}$ that have been previously identified as malicious from different sources. In one embodiment, the malicious file collecting module 307 communicates with an anti-malware software platform (e.g., cloud-based) which identifies malicious files $303_{MALICIOUS}$ during its ordinary course of operation (e.g., using signature or heuristic detection techniques). In this embodiment, the anti-malware software platform provides identified malicious files $303_{MALICIOUS}$ to the malicious file collecting module 307. In other embodiments, the malicious file collecting module 307 obtains previously identified malicious files $303_{MALICIOUS}$ from a database or other listing of identified malware, or from other sources as desired. A large volume of malware is detected by a variety of sources on a daily basis, and is thus available to the malicious file collecting module 307. As noted above, the malicious file collecting module 307 collects a current selection of previously identified malicious files $303_{MALICIOUS}$ in formats that are tested by the automated malware analysis environment 301. By obtaining a current collection of identified malicious files $303_{MALICIOUS}$ in these formats, the malicious file collecting module 307 maintains a current selection that is used for optimization purposes as described below. How many malicious files $303_{MALICIOUS}$ to obtain in which format is a variable design parameter, as is how often to obtain new malicious files $303_{MALICIOUS}$ to keep the collection current, a process which is described below in more detail.

A malicious file opening module 309 of the automated malware analysis optimization system 101 opens (e.g., reads, plays, views, executes) each malicious file $303_{MALICIOUS}$ of the collection multiple times, using different versions of one or more software programs 305 that correspond(s) to the format of the file. For example, the malicious file opening module 309 could open a malicious .PDF one or more times with each of a plurality of versions of Adobe Reader. This is just an example, and malicious files $303_{MALICIOUS}$ in other formats can be opened/played/viewed using multiple versions of one or more corresponding software programs 305 as desired (e.g., malicious video or audio files $303_{MALICIOUS}$ can be played using multiple versions of one or more video and/or audio players, malicious documents or images can be opened using multiple versions of one or more document readers/image viewers, malicious runtime components such as Java applets can be opened using multiple versions of runtime environments such as Java runtime, etc.). Which specific versions of which specific software programs 305 to use is a variable design parameter, based on, for example, which software programs 305 are to be used in the automated malware analysis environment 301, and which versions thereof are in active use in the field. It is also a variable design parameter how many times to open different given ones of the malicious files $303_{MALICIOUS}$ with each given program 305 version in order to analyze it. The above-described opening of malicious files $303_{MALICIOUS}$ is conducted in a controlled environment such as on a virtual machine or in a sandbox. In the manner described above, the malicious file opening module 309 uses multiple programs 305 to open malicious files $303_{MALICIOUS}$ in multiple file formats.

During the opening of malicious files $303_{MALICIOUS}$, a malicious file analyzing module 311 of the automated malware analysis optimization system 101 analyzes their behavior, and collects observations concerning malicious behaviors performed by the malicious files $303_{MALICIOUS}$. Because it is known that the files $303_{MALICIOUS}$ are malicious, the analyzing module 311 can determine whether known attacks and/or exploits are reliably repeated when specific malicious files $303_{MALICIOUS}$ are opened with specific versions of various programs 305. In conjunction with the malicious file analyzing module 311 observing the behavior of known malicious files $305_{MALICIOUS}$ when they are opened by different versions of corresponding software programs 305, a program exploitability determining module 313 of the automated malware analysis optimization system 101 determines which versions of a given software program 305 are the most exploitable, based on the observed behavior (e.g., the number and/or frequency of malicious events observed) when the different versions are used to open malicious files $305_{MALICIOUS}$. For example, if two different attacks are observed every time a particular malicious file $303_{MALICIOUS}$ is opened with one version of a software program 305, one attack observed two thirds of the time the same malicious file $303_{MALICIOUS}$ is opened with a second version of the same software program 305, and no attacks are observed when the malicious file $303_{MALICIOUS}$ is opened with a third version of the program 305, the analysis would indicate that the first version is the most exploitable, the second version the second most, and the third version the least. In practice, more than three versions of a software program 305 can be analyzed as desired. The program exploitability determining module 313 thus ranks the exploitability of the different versions of a given software program 305 relative to each other, e.g., from most to least exploitable.

In some embodiments, in addition to the number and/or frequency of attacks and exploits observed, the exploitability determining module 313 can take severity and/or targets of the attacks into account when ranking the exploitability of different versions of a software program 305. For example, malicious network activity could be considered to be more severe than unauthorized reading from the registry. Thus, in this embodiment, a version of a software program 305 under which a malicious file $303_{MALICIOUS}$ consistently makes unauthorized network transmissions would be considered more exploitable than a different version in which the same file $303_{MALICIOUS}$ does not access the network does access the registry, all else being equal. This is just an example, and what severity weights to assign to which different malicious activities is a variable design parameter. In other embodiments, no distinction is made between types of attacks when ranking the exploitability of different versions of a given software program 305.

For each software program 305 the automated malware analysis environment 301 uses to test received files 303 for maliciousness, the N most exploitable versions thereof are used to open and test the file 303, in order as per the relative ranking described above. More specifically, when deployed in a production environment, the automated malware analysis environment 301 receives submitted files 303 to automatically test for maliciousness. To do so, when the automated malware analysis environment 301 receives a submitted file 303 in a given format, it uses the N most exploitable versions of one or more corresponding software programs 305, in order from most to least exploitable, to open the submitted file 303 for disposition. For example, when a .PDF is submitted to the automated malware analysis environment 301, the automated malware analysis environment 301 could use the N most exploitable versions of Adobe Reader to open the file 303 and test it to determine whether or not it is malicious. If malicious active is detected when a file 303 is opened by any version, a maliciousness adjudication is made and the file 303 need not be tested using the other versions of the software program 305. On the other hand, if a file 303 is opened with each of the N versions of the software program without detecting malicious activity, the file 303 is adjudicated as being benign. The specific value of N to use is a variable design parameter (e.g., 2, 3, 4). Because N is typically less than the total available number of versions of a given software program 305, opening each received file with at most N versions reduces the time and computing resources spent per file 303. However, because the most exploitable versions of each software program 305 have been identified as described above, malicious files $303_{MALICIOUS}$ are likely to be identified. Furthermore, because files are opened by versions of a software program 305 starting with the most exploitable, malicious files $303_{MALICIOUS}$ are often identified without even having to test with each of the N versions. Without the use of the automated malware analysis optimization system 101, more versions of each software program 305 are used to test each submitted file 303, resulting in longer disposition times. The automated malware analysis optimization system 101 enables most malicious files 303 to be caught with a smaller number of software versions, thereby reducing not only the disposition time, but reducing the usage of computational resources on the backend.

Periodically, the malicious file collecting module 307 updates the collection of malicious files $303_{MALICIOUS}$ so that a current selection of previously identified malicious files $303_{MALICIOUS}$ is maintained. How frequently and to what extent to update the selected collection are variable design parameters. The malicious file analyzing module 311 can then periodically rerun the above described analysis process, using the updated selection of malware, and the program exploitability determining module 313 can determine current exploitability rankings of different versions of various software programs 305. Once again, the frequency with which to do so is a variable design choice. Additionally, whenever a new version of a given software program 305 is released, the analysis process can be rerun for that program 305 with the new version included, in order to determine and rank exploitability of each version of that program, including the new version. These updating measures enable the most currently exploitable versions of software programs 305 to remain in use, relative to current malware with exploits being used in the wild.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for optimizing a malware analysis environment that automatically analyzes submitted files to test for maliciousness, the method comprising:

collecting, by a computer, a current selection of previously identified malicious files, the current selection comprising identified malicious files in a plurality of file formats that are tested by the malware analysis environment;

for each specific malicious file of the current selection, opening, by the computer, the specific malicious file multiple times using multiple versions of at least one program that corresponds to a file format of the specific malicious file, wherein a plurality of programs are used to open malicious files in different ones of the plurality of file formats;

analyzing, by the computer, behavior of each malicious file as it is opened with each version of the at least one program, wherein analyzing behavior of a malicious file as it is opened with a version of a program further comprises collecting observations concerning malicious behaviors performed by the malicious file when it is opened with the version of the program, and determining whether known attacks are reliably repeated when the malicious file is opened with the version of the program;

for each specific one of the plurality of programs used to open at least one malicious file, determining and ranking, by the computer, exploitability of each version of the specific program based on observed behavior of the at least one malicious file as it is opened with each version of the specific program; and using, by the malware analysis environment, a specific number of versions of each program of the plurality of programs to test files in at least one corresponding format for maliciousness, in order from more exploitable to less exploitable based on the ranking.

2. The method of claim 1 wherein collecting a current selection of previously identified malicious files further comprises:

collecting a current selection of previously identified malicious media files in multiple Multipurpose Internet Mail Extension ("MIME) formats.

3. The method of claim 1 wherein collecting a current selection of previously identified malicious files further comprises:

receiving a current selection of previously identified malicious files in a plurality of file formats that are tested by the malware analysis environment from an anti-malware software platform which identifies malicious files during its ordinary course of operation.

4. The method of claim 1 wherein the plurality of programs used to open malicious files in different ones of the plurality of file formats further comprises:

at least two types of program from a group of program types consisting of: document readers, image viewers, audio players, video players and runtime environments.

5. The method of claim 1 wherein opening a specific malicious file multiple times using multiple versions of at least one program that corresponds to a file format further comprises:

opening the specific malicious file multiple times using each one of multiple versions of at least one program that corresponds to the file format.

6. The method of claim 1 wherein opening a specific malicious file multiple times using multiple versions of at least one program that corresponds to a file format further comprises:

opening the specific malicious file one time each using each one of multiple versions of at least one program that corresponds to the file format.

7. The method of claim 1 wherein ranking exploitability of a version of a specific program based on observed behavior of the at least one malicious file as it is opened with the version of the specific program further comprises:

ranking the exploitability of the version of the specific program based on a number of attacks observed when the at least one malicious file is opened with the version of the specific program.

8. The method of claim 1 wherein ranking exploitability of a version of a specific program based on observed behavior of the at least one malicious file as it is opened with the version of the specific program further comprises:

ranking the exploitability of the version of the specific program based on frequency of attacks observed when the at least one malicious file is opened with the version of the specific program.

9. The method of claim 1 wherein ranking exploitability of a version of a specific program based on observed behavior of the at least one malicious file as it is opened with the version of the specific program further comprises:

ranking the exploitability of the version of the specific program based on weighted severity of attacks observed when the at least one malicious file is opened with the version of the specific program.

10. The method of claim 1 wherein ranking exploitability of a version of a specific program based on observed behavior of the at least one malicious file as it is opened with the version of the specific program further comprises:

ranking the exploitability of the version of the specific program based on targets of attacks observed when the at least one malicious file is opened with the version of the specific program.

11. The method of claim 1 wherein:

the specific number of versions of a specific program used to test files is less than a total available number of versions of the specific program.

12. The method of claim 1 further comprising:

periodically updating the current selection of previously identified malicious files.

13. The method of claim 1 further comprising:

maintaining a current selection of previously identified malicious files.

14. The method of claim 1 further comprising:

periodically analyzing behavior of each current malicious file as it is opened with each version of the at least one program.

15. The method of claim 1 further comprising:

periodically determining current exploitability rankings of versions of software programs.

16. The method of claim 1 further comprising:

responsive to a new version of a specific program being released, determining and ranking exploitability of each version of the specific program based on observed behavior of the at least one malicious file as it is opened with each version of the specific program.

17. At least one non-transitory computer readable medium for optimizing a malware analysis environment that automatically analyzes submitted files to test for maliciousness, the at least one non-transitory computer readable medium storing computer executable instructions that, when loaded into computer memory and executed by at least one processor of at least one computing device, cause the at least one computing device to perform the following steps:

collecting a current selection of previously identified malicious files, the current selection comprising identified malicious files in a plurality of file formats that are tested by the malware analysis environment;

for each specific malicious file of the current selection, opening the specific malicious file multiple times using multiple versions of at least one program that corresponds to a file format of the specific malicious file, wherein a plurality of programs are used to open malicious files in different ones of the plurality of file formats;

analyzing behavior of each malicious file as it is opened with each version of the at least one program, wherein analyzing behavior of a malicious file as it is opened with a version of a program further comprises collecting observations concerning malicious behaviors performed by the malicious file when it is opened with the version of the program, and determining whether known attacks are reliably repeated when the malicious file is opened with the version of the programs;

for each specific one of the plurality of programs used to open at least one malicious file, determining and ranking exploitability of each version of the specific program based on observed behavior of the at least one malicious file as it is opened with each version of the specific program; and using, by the malware analysis environment, a specific number of versions of each program of the plurality to test files in at least one corresponding format for maliciousness, in order from more exploitable to less exploitable based on the ranking.

18. A computer implemented method for optimizing a malware analysis environment that automatically analyzes submitted files to test for maliciousness, the method comprising:

collecting, by a computer, a current selection of previously identified malicious files, the current selection comprising identified malicious files in a plurality of file formats that are tested by the malware analysis environment;

for each specific malicious file of the current selection, opening, by the computer, the specific malicious file multiple times using multiple versions of at least one program that corresponds to a file format of the specific malicious file, wherein a plurality of programs are used to open malicious files in different ones of the plurality of file formats;

analyzing, by the computer, behavior of each malicious file as it is opened with each version of the at least one program;

for each specific one of the plurality of programs used to open at least one malicious file, determining and ranking, by the computer, exploitability of each version of the specific program based on observed behavior of the at least one malicious file as it is opened with each version of the specific program;

wherein ranking exploitability of a version of a specific program based on observed behavior of the at least one malicious file as it is opened with the version of the specific program further comprises ranking the exploitability of the version of the specific program based on at least two factors from a group consisting of: 1) ranking the exploitability of the version of the specific program based on a number of attacks observed when the at least one malicious file is opened with the version of the specific program; 2) ranking the exploitability of the version of the specific program based on frequency of attacks observed when the at least one malicious file is opened with the version of the specific program; 3) ranking the exploitability of the version of the specific program based on weighted severity of attacks observed when the at least one malicious file is opened with the version of the specific program; and 4) ranking the exploitability of the version of the specific program based on targets of attacks observed when the at least one malicious file is opened with the version of the specific program; and using, by the malware analysis environment, a specific number of versions of each program of the plurality of programs to test files in at least one corresponding format for maliciousness, in order from more exploitable to less exploitable based on the ranking.

19. The method of claim 18 wherein analyzing behavior of a malicious file as it is opened with a version of a program further comprises:

collecting observations concerning malicious behaviors performed by the malicious file when it is opened with the version of the program.

20. The method of claim 18 wherein analyzing behavior of a malicious file as it is opened with a version of a program further comprises:

determining whether known attacks are reliably repeated when the malicious file is opened with the version of the program.

\* \* \* \* \*